US011401038B1

(12) United States Patent
Warwick et al.

(10) Patent No.: US 11,401,038 B1
(45) Date of Patent: Aug. 2, 2022

(54) AIRCRAFT SEAT

(71) Applicant: B/E Aerospace, Inc., Winston-Salem, NC (US)

(72) Inventors: Michael R. G. Warwick, Pleasant Garden, NC (US); Lyle T. Davis, Pfafftown, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/341,096

(22) Filed: Jun. 7, 2021

(51) Int. Cl.
*B64D 11/06* (2006.01)

(52) U.S. Cl.
CPC ........ *B64D 11/064* (2014.12); *B64D 11/0643* (2014.12); *B64D 11/0641* (2014.12)

(58) Field of Classification Search
CPC .................................................. B64D 11/0643
See application file for complete search history.

(56) References Cited

U.S. PATENT DOCUMENTS

| 9,120,574 B2 | 9/2015 | Ligonniere et al. |
| 10,486,814 B2 | 11/2019 | Texeraud et al. |
| 10,829,222 B2 | 11/2020 | Garza et al. |
| 10,940,950 B2 | 3/2021 | Bang et al. |

| 2007/0145806 A1 | 6/2007 | Wilder et al. | |
| 2011/0001343 A1* | 1/2011 | Ellison | B60N 2/3013 |
| | | | 297/340 |
| 2020/0277059 A1 | 9/2020 | Ng | |

FOREIGN PATENT DOCUMENTS

| CA | 2577365 C | 2/2013 | |
| CA | 2980581 A1 * | 3/2018 | ........... B60N 2/2222 |
| EP | 1116654 B1 | 6/2005 | |
| EP | 2408642 A2 | 1/2012 | |
| EP | 3231706 A1 | 10/2017 | |
| EP | 3118116 B1 | 7/2019 | |
| EP | 3385115 B1 | 6/2020 | |
| EP | 3519243 A4 | 6/2020 | |
| GB | 2539913 B | 10/2019 | |
| HK | 1156008 A1 | 6/2012 | |
| JP | H0159441 U * | 4/1989 | ............... B60N 1/06 |
| JP | 2013545659 A | 12/2013 | |
| WO | 2019183481 A1 | 9/2019 | |

* cited by examiner

*Primary Examiner* — Anthony D Barfield
(74) *Attorney, Agent, or Firm* — Suiter Swantz pc llo

(57) ABSTRACT

A seat drivetrain assembly for an aircraft seat is disclosed. The assembly may include a seatback drivetrain sub-assembly configured to actuate a seatback frame of a seat frame of the aircraft seat between a first position and at least a second position. The assembly may include a seat pan drivetrain sub-assembly configured to actuate a seat pan frame of the seat frame of the aircraft seat between a first position and at least a second position. The assembly may include an actuator sub-assembly configured to cause one of the seatback drivetrain sub-assembly or the seat pan drivetrain sub-assembly to actuate one of the seatback frame or the seat pan frame of the aircraft seat between the first position and the at least second position.

15 Claims, 15 Drawing Sheets

AIRCRAFT SEAT

BACKGROUND

Select aircraft seats may be configured to actuate between an upright or raised position and a lie-flat or bed position. This actuation may occur with the assistance of multiple actuators, which increases the complexity, cost, and weight of the aircraft seat.

SUMMARY

A seat drivetrain assembly for an aircraft seat is disclosed. In one embodiment, the assembly includes a seatback drivetrain sub-assembly configured to actuate a seatback frame of a seat frame of the aircraft seat between a first position and at least a second position. In another embodiment, the seatback drivetrain sub-assembly comprises: a first gear coupled to a portion of the seatback frame, the first gear including teeth along at least a portion of an exterior surface of the first gear; a second gear including teeth protruding radially from a center of the second gear, the second gear coupled to a portion of the seat frame of the aircraft seat via an axle, the axle configured to rotate to cause the second gear to rotate about an axis to cause the teeth of the second gear to engage with the teeth of the first gear to cause the first gear to actuate the seatback frame between the first position and the at least second position; and one or more rack-and-pinion assemblies, each rack-and-pinion assembly including a pinion gear and a gear rack, the gear rack configured to couple to a surface of a base assembly of the aircraft seat, the pinion gear configured to engage with the gear rack to cause the seatback frame to translate between a first position and at least a second position. In another embodiment, the assembly includes a seat pan drivetrain sub-assembly configured to actuate a seat pan frame of the seat frame of the aircraft seat between a first position and at least a second position, the seat pan drivetrain sub-assembly comprising: a spreader including a groove, the groove having an arc-shape; and a cam-and-follower sub-assembly including a cam and a follower, the cam-and-follower sub-assembly configured to engage with the groove of the spreader and translate along the arc-shaped groove when the seat pan frame actuates between the first position and the at least second position. In another embodiment, the assembly includes an actuator sub-assembly configured to cause one of the seatback drivetrain sub-assembly or the seat pan drivetrain sub-assembly to actuate one of the seatback frame or the seat pan frame of the aircraft seat between the first position and the at least second position, the actuator sub-assembly comprising an actuator coupled to the seat frame.

In some embodiments, the first gear may include a sector gear.

In some embodiments, the exterior surface of the first gear may be arc-shaped.

In some embodiments, the second gear may include a spur gear.

In some embodiments, the actuator sub-assembly may further include a ball-and-screw nut assembly including a ball screw and a ball nut.

In some embodiments, the assembly may further include a leg rest drivetrain sub-assembly configured to actuate a leg rest frame section of the seat pan frame of the aircraft seat between a first position and at least a second position.

In some embodiments, the leg rest frame section may be coupled to a portion of the seatback frame via a two-part hinge assembly, the two-part hinge assembly including a first component coupled to a portion of the seat pan frame and a second component coupled to the leg rest frame.

In some embodiments, the leg rest drivetrain sub-assembly may include a link coupled to a portion of the leg rest frame section and a portion of the first gear.

In some embodiments, the first position may include a taxi, take-off, or landing (TTL) position, the at least the second position including at least one non-TTL position.

An aircraft seat is disclosed, in accordance with one or more embodiments of the disclosure. In one embodiment, the aircraft seat includes a base assembly couplable to a floor of an aircraft cabin. In another embodiment, the aircraft seat includes a seat drivetrain assembly configured to actuate the aircraft seat between a first position and at least a second position. In another embodiment, the aircraft seat includes a seat frame coupled to the base assembly via the seat drivetrain assembly, the seat frame including a seatback frame and a seat pan frame, the seat frame further including a leg rest frame coupled to a portion of the seat pan frame. In another embodiment, the seat drivetrain assembly includes a seatback drivetrain sub-assembly configured to actuate the seatback frame between a first position and at least a second position. In another embodiment, the seatback drivetrain sub-assembly comprises: a first gear coupled to a portion of the seatback frame, the first gear including teeth along at least a portion of an exterior surface of the first gear; a second gear including teeth protruding radially from a center of the second gear, the second gear coupled to a portion of the seat frame via an axle, the axle configured to rotate to cause the second gear to rotate about an axis to cause the teeth of the second gear to engage with the teeth of the first gear to cause the first gear to actuate the seatback frame between the first position and the at least second position; and one or more rack-and-pinion assemblies, each rack-and-pinion assembly including a pinion gear and a gear rack, the gear rack configured to couple to a surface of the base assembly of the aircraft seat, the pinion gear configured to engage with the gear rack to cause the seatback frame to translate between a first position and at least a second position. In another embodiment, the seat drivetrain assembly includes a seat pan drivetrain sub-assembly configured to actuate a seat pan frame of the seat frame of the aircraft seat between a first position and at least a second position. In another embodiment, the seat pan drivetrain sub-assembly comprises: a spreader including a groove, the groove having an arc-shape; and a cam-and-follower sub-assembly including a cam and a follower, the cam-and-follower sub-assembly configured to engage with the groove of the spreader and translate along the arc-shaped groove when the seat pan frame actuates between the first position and the at least second position. In another embodiment, the seat drivetrain assembly includes an actuator sub-assembly configured to cause one of the seatback drivetrain sub-assembly or the seat pan drivetrain sub-assembly to actuate one of the seatback frame or the seat pan frame between the first position and the at least second position. In another embodiment, the actuator sub-assembly includes an actuator coupled to the seat frame.

In some embodiments, the first gear may include a sector gear.

In some embodiments, the exterior surface of the first gear may be arc-shaped.

In some embodiments, the second gear may include a spur gear.

In some embodiments, the actuator sub-assembly may further include a ball-and-screw nut assembly including a ball screw and a ball nut.

In some embodiments, the assembly may further include a leg rest drivetrain sub-assembly configured to actuate a leg rest frame section between a first position and at least a second position.

In some embodiments, the leg rest frame section may be coupled to a portion of the seat pan frame via a two-part hinge assembly, the two-part hinge assembly including a first component coupled to a portion of the seat pan frame and a second component coupled to the leg rest frame.

In some embodiments, the leg rest drivetrain sub-assembly may include a link coupled to a portion of the leg rest frame section and a portion of the first gear.

In some embodiments, the first position may include a taxi, take-off, or landing (TTL) position, the at least the second position including at least one non-TTL position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
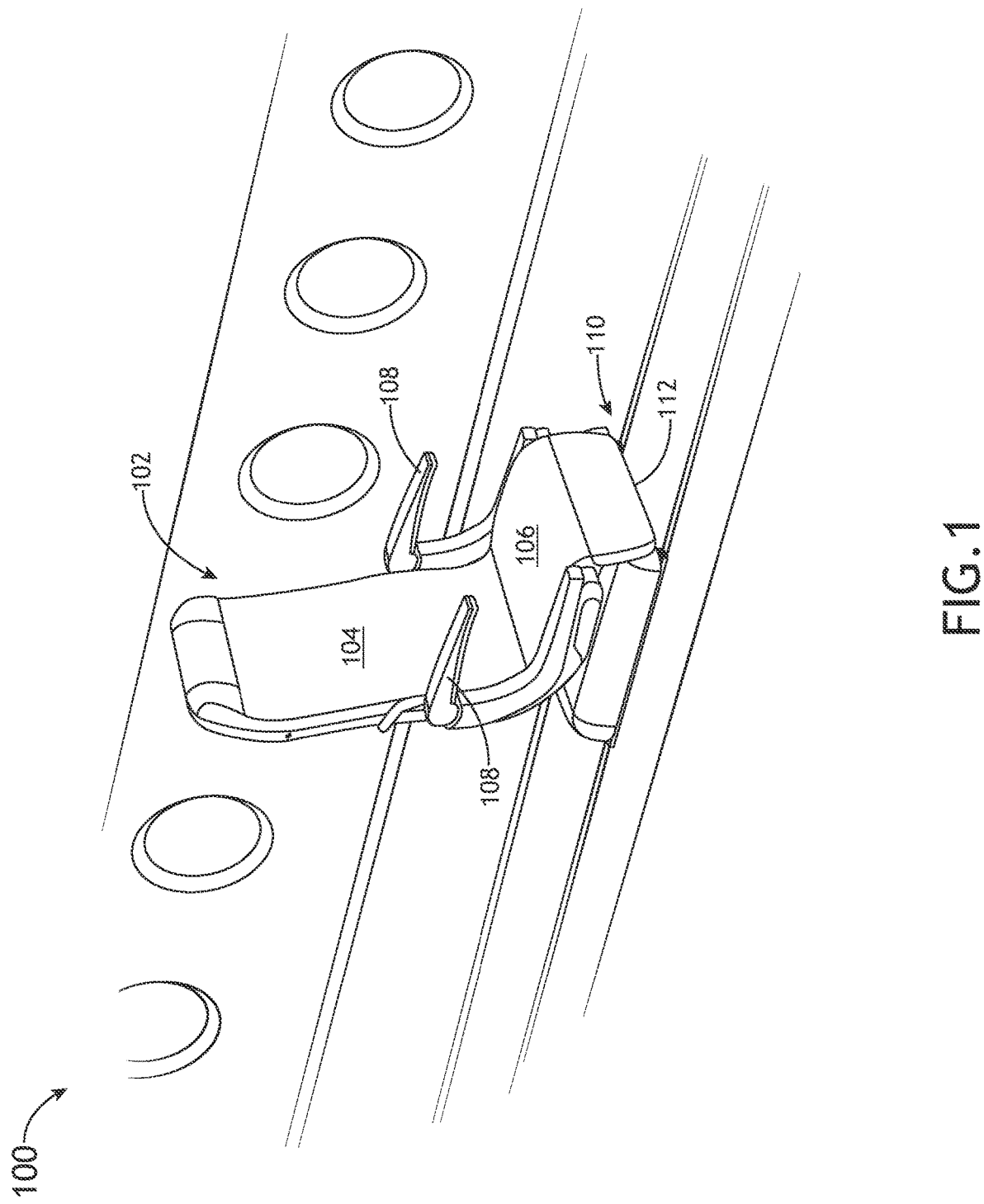
FIG. 1 illustrates a perspective view of an aircraft seat, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-7B in general illustrate a seat drivetrain assembly for an aircraft seat, in accordance with one or more embodiments of the disclosure.

Select aircraft seats may be configured to actuate between an upright or raised position and a lie-flat or bed position. This actuation may occur with the assistance of multiple actuators, which increases the complexity, cost, and weight of the aircraft seat.

In addition, in select industries the build of the seat (and any included components within the build) may be required to meet guidelines and/or standards. For example, aircraft seats may be required to meet aviation guidelines and/or standards. For instance, the select aircraft seats may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. Aircraft seats may present difficulties such as, but not limited to, failing to meet load requirements ((e.g., 9 g static load requirements or 16 g dynamic load requirements), burn requirements, or the like as set forth by the FAA in 14 C.F.R. Part 25, AIRWORTHINESS STANDARDS: TRANSPORT CATEGORY AIRPLANES).

As such, it may be desirable to provide a seat drivetrain assembly for an aircraft seat. The seat drivetrain assembly may result in a reduced weight, cost, and/or complexity of the aircraft seat. The aircraft seat should meet load requirements of aviation guidelines and/or standards.

FIG. 1 in general illustrates an aircraft cabin 100 including an aircraft seat 102, in accordance with one or more embodiments of the disclosure.

The aircraft seat 102 may include a seatback 104. The aircraft seat 102 may include a seat pan 106. The aircraft seat 102 may include one or more arms 108. The aircraft seat 102 may be coupled to a base 110. The base 110 may be covered by a shroud 112. For example, the shroud 112 may include one or more sections configured to cover at least a portion of the aircraft seat 102. For instance, the shroud 112 may include a bucket shroud section and a base shroud section. It is noted, however, that the shroud 112 may be formed from one piece (i.e., includes a single section).

The seatback 104 may include a headrest. For example, the headrest may be integrated within the seatback 104. By way of another example, the headrest may be a separate component coupled to (or inserted into) the seatback 104. For instance, the headrest may be movable relative to the seatback frame of the aircraft seat 102 (e.g., adjustable, removable, or the like).

The seat pan 106 may be coupled to the seatback 104, such that actuation of one may cause a corresponding actuation of the other. For example, the seat pan 106 may be coupled to the seatback 104 via one or more pivot joints. For instance, the seatback 104 may be configured to rotate about an axis through a pivot joint coupling the seatback 104 and the seat pan 106 during actuation between the upright position and the lie-flat or bed position.

Figure 2:
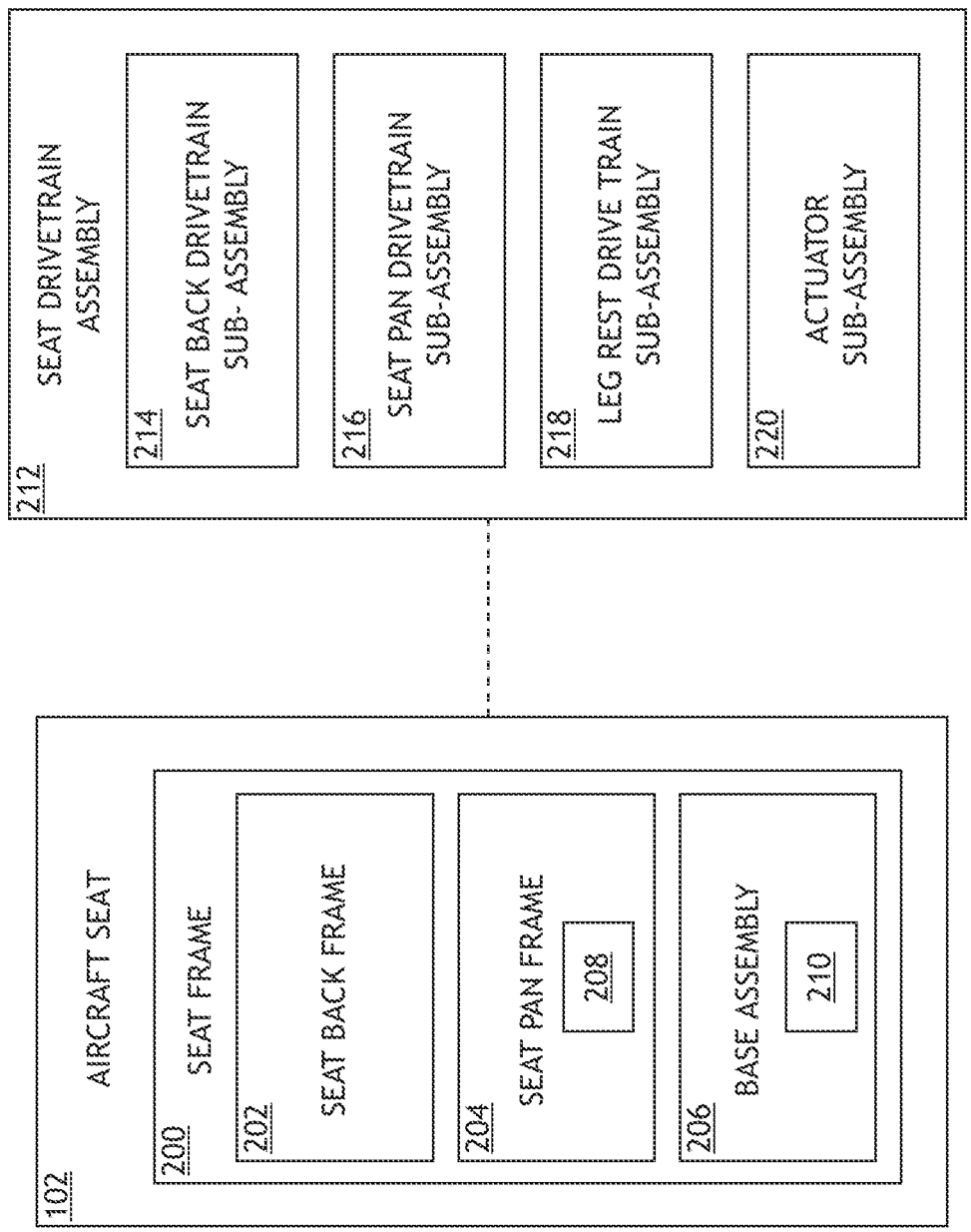
FIG. 2 illustrates a simplified block diagram of a seat drivetrain assembly, in accordance with one or more embodiments of the disclosure.

Referring to FIG. 2, the aircraft seat 102 may include a seat frame 200. The seat frame 200 may include, but is noted limited to, a seatback frame 202, a seat pan frame 204, and a base assembly 206.

The seatback 104 may be fixed to the seatback frame 202. The seat pan 106 may be fixed to the seat pan frame 204.

The seat frame 200 may further include a leg rest frame 208 coupled to the seat pan frame section 204 via a hinge assembly 348. For example, the hinge assembly 348 may include two or more components, where the first component is coupled to the seat pan frame 204 and the second component is coupled to the leg rest frame 208. The leg rest frame 208 may be further coupled to the seatback frame 202 via a link 346 and the sector gear 300. For example, the link 346 may be configured to couple the leg rest frame 208 to the seatback frame 202.

It is noted that the seat frame 200 may be fabricated using any technique and using any materials. For example, one or more components of the seat frame 200 may be formed of sheet metal. In this regard, the sheet metal may be configured to reduce the cost and weight of the seat frame 200.

The base assembly 206 may include one or more fixed base rails 210 (e.g., tubes, base, or the like). For example, the one or more base rails 210 may be positioned relative to a particular direction of travel of the aircraft seat 102 including, but not limited to, perpendicular (e.g., cross-wise), parallel (e.g., cross-wise), or the like. For instance, the one or more base rails 210 may be positioned relative to a same or different direction of the aircraft seat 102. The one or more fixed base rails 210 may be coupled to a set of floor tracks of the aircraft cabin 100 via one or more floor fittings. At least a portion of the shroud 112 (e.g., the base shroud section of the shroud 112) may be configured to cover the base assembly 206.

The aircraft seat 102 may include a seat drivetrain assembly 212. The seat drivetrain assembly 212 may include, but is not limited to, a seatback drivetrain sub-assembly 214, a seat pan drivetrain sub-assembly 216, a leg rest drivetrain sub-assembly 218, and an actuator sub-assembly 220. It is noted that the seat drivetrain assembly 212 may be adapted and mounted in any orientation to cater to various aircraft seat base designs and requirements. In general, the aircraft seat 102 may be actuatable between one or more positions using the seat drivetrain assembly 212. For example, the one or more positions may include, but not limited to, an upright or raised position, one or more lounge or reclined positions, and/or a lie-flat or bed position. For instance, the aircraft seat 102 may be configured to pass through the one or more lounge or reclined positions when actuating between the upright or raised position and the lie-flat or bed position. It is noted, however, that the one or more lounge or reclined positions of the aircraft seat 102 may be separate from the one or more upright or raised positions and/or the one or more lie-flat or bed positions. Therefore, the above description should not be interpreted as a limitation on the present disclosure but merely an illustration.

Further, it is noted that the aircraft seat 102 may be adapted and mounted in any orientation to cater to various aircraft seat base designs and requirements. For example, the aircraft seat 102 may be mounted at an oblique angle with respect to the longitudinal axis of the aircraft.

In general, the aircraft seat 102 may be translatable (e.g., trackable or slidable). The aircraft seat 102 may be rotatable about an axis cross-wise through the aircraft seat 102 into a position including, but not limited to, the upright or raised position, the one or more lounge or reclined positions, and/or the lie-flat or bed position. The aircraft seat 102 may be fully positionable between the outer limits of motion as defined by the moveable components of the aircraft seat 102, adjacent aircraft seats 102, monuments within an aircraft cabin 100, and/or monuments of a passenger compartment.

It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 102 may be actuatable (e.g., translatable and/or rotatable) from the TTL position to a non-TTL position, or vice versa. Further, it is noted the aircraft seat 102 may be capable of a fully upright or raised position, and that the TTL position may have a more reclined seatback and a more angled upward seat pan as compared to the fully upright or raised position. Therefore, the above description should not be interpreted as a limitation on the present disclosure but merely an illustration.

FIGS. 3A-7B generally illustrate a seat frame 200 integrated with a seat drivetrain assembly 212, in accordance with one or more embodiments of the disclosure.

Figure 3A:
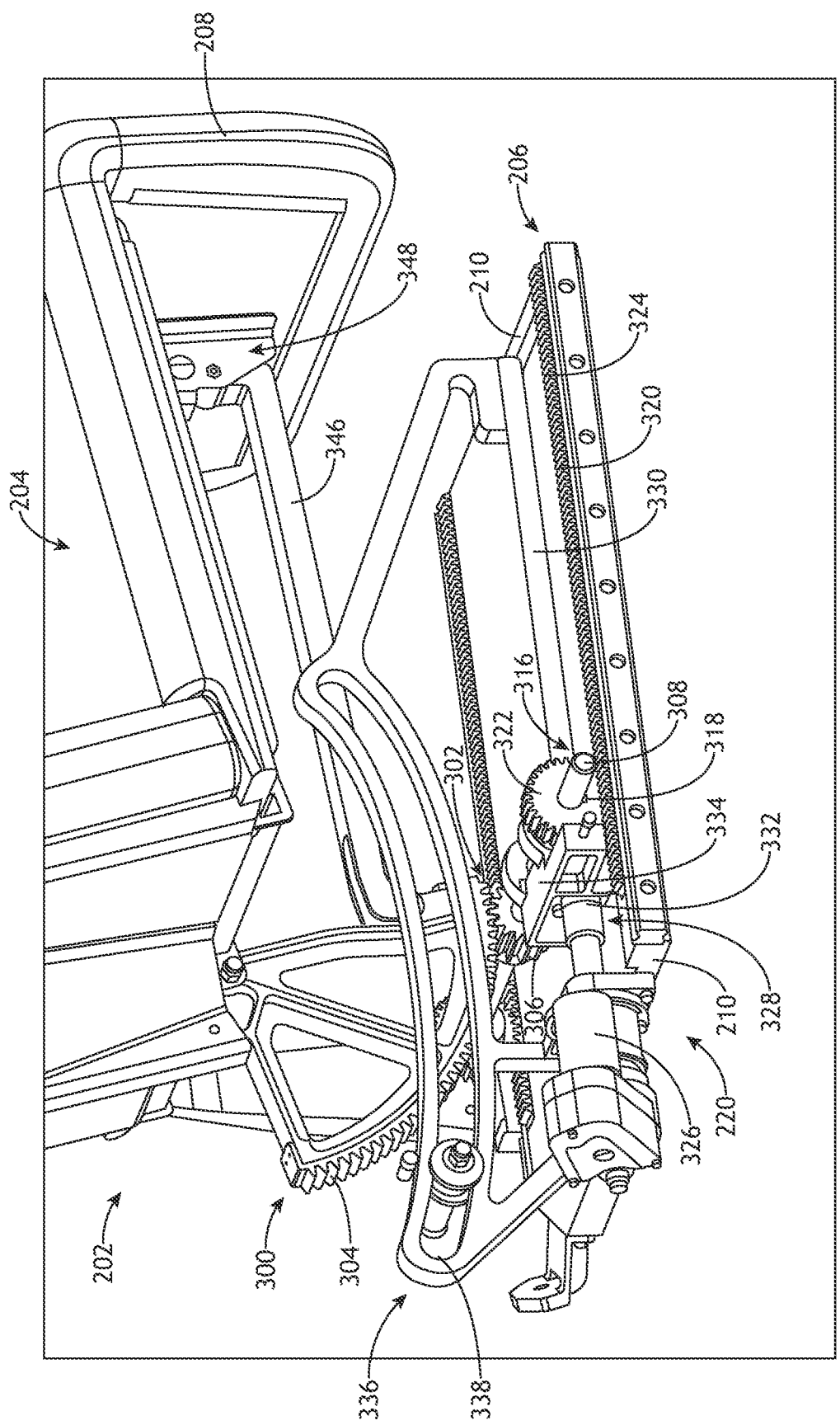
FIG. 3A illustrates the seat drivetrain assembly, in accordance with one or more embodiments of the disclosure.
Figure 3B:
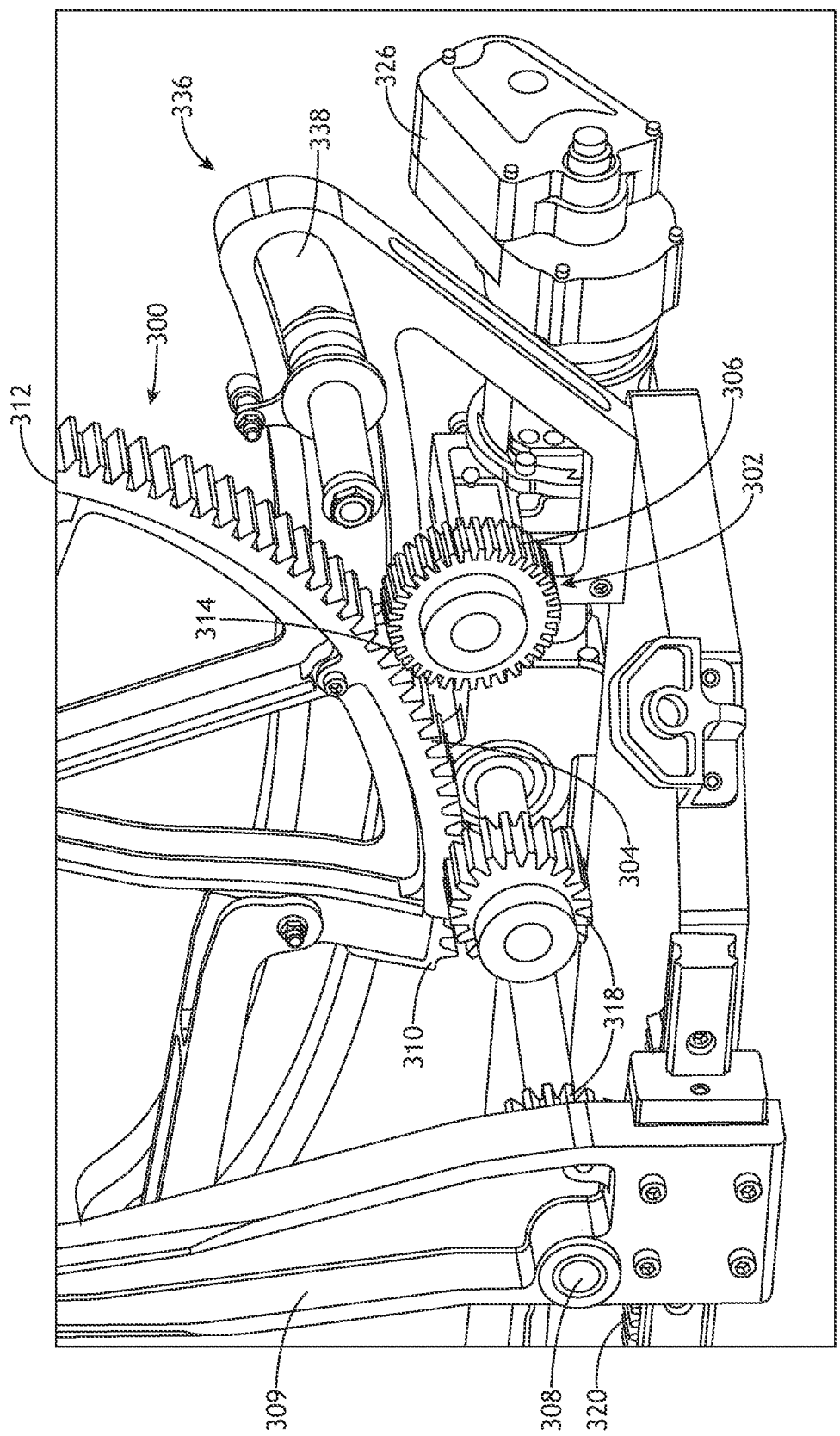
FIG. 3B illustrates the seat drivetrain assembly, in accordance with one or more embodiments of the disclosure.
Figure 3C:
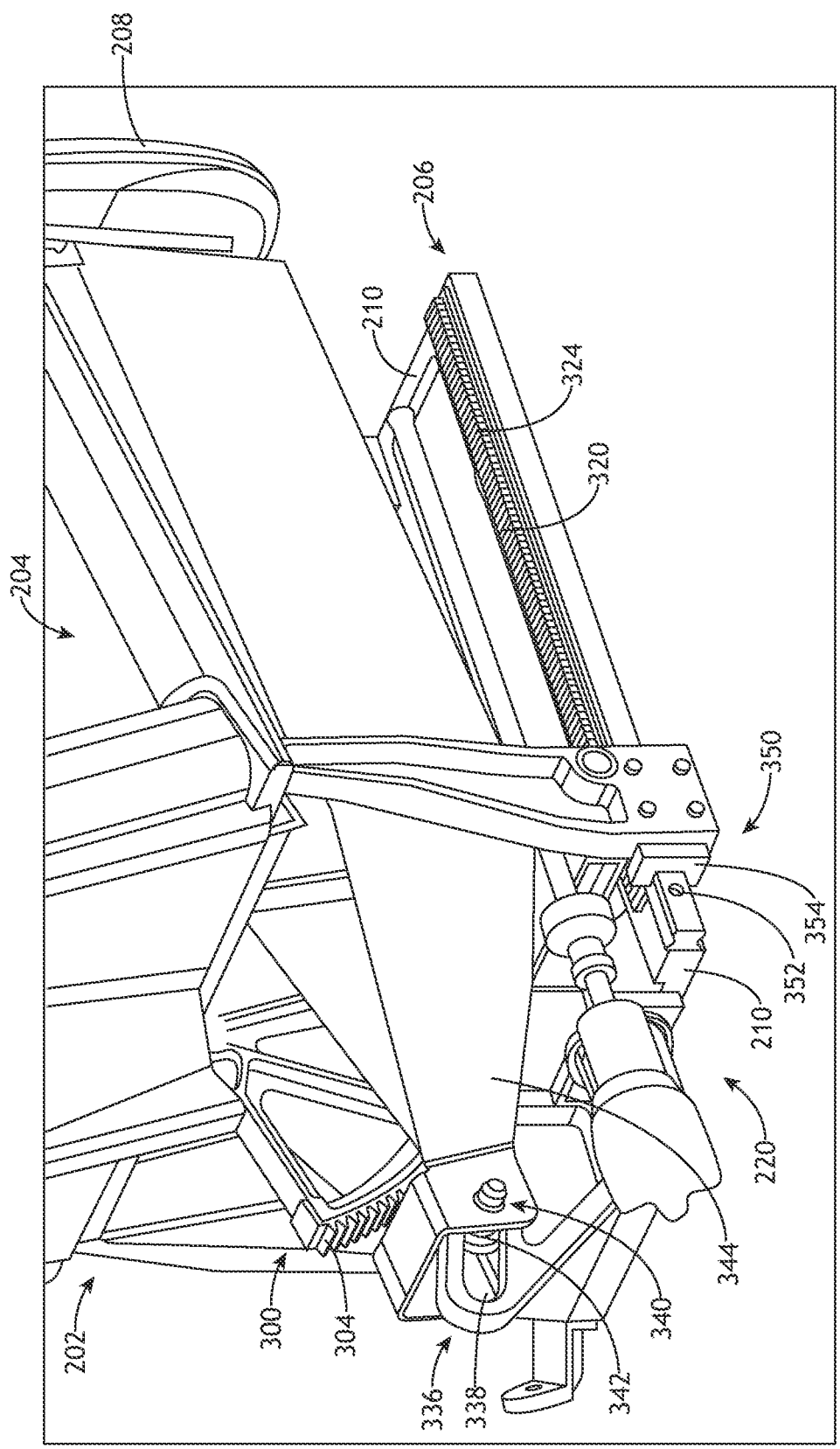
FIG. 3C illustrates the seat drivetrain assembly, in accordance with one or more embodiments of the disclosure.
Figure 4A:
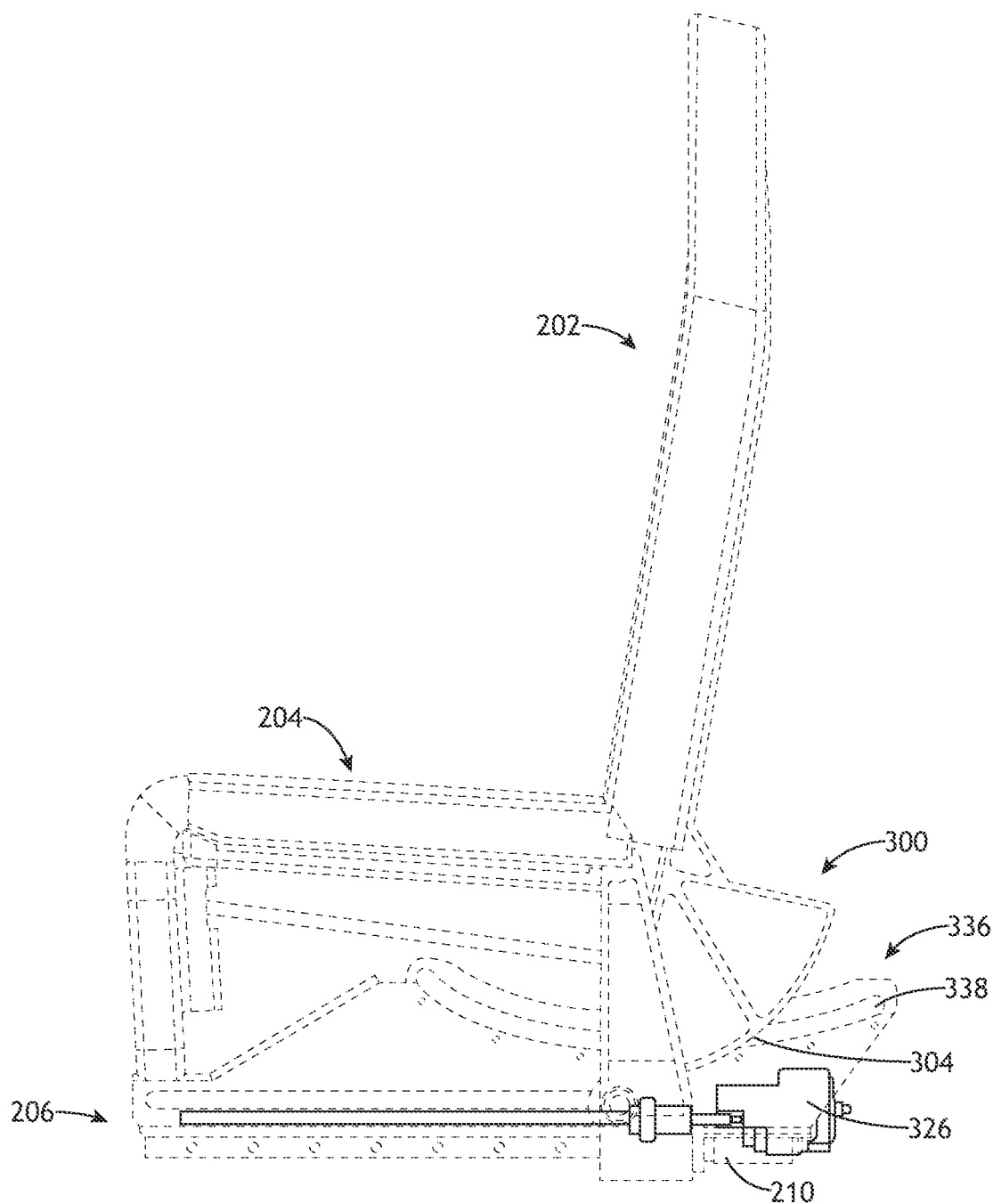
FIG. 4A illustrates the seat drivetrain assembly, in accordance with one or more embodiments of the disclosure.
Figure 4B:
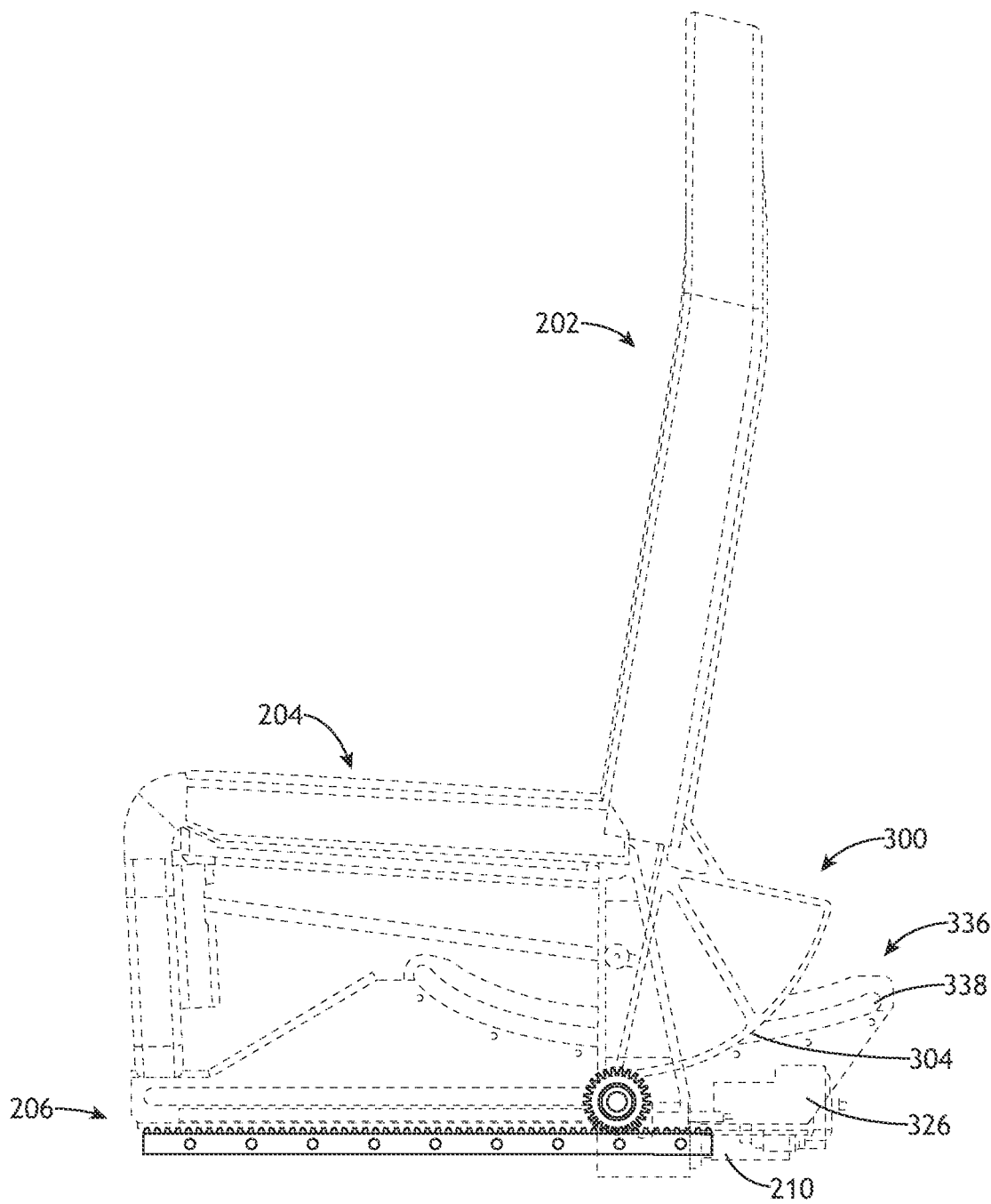
FIG. 4B illustrates the seat drivetrain assembly, in accordance with one or more embodiments of the disclosure.
Figure 4C:
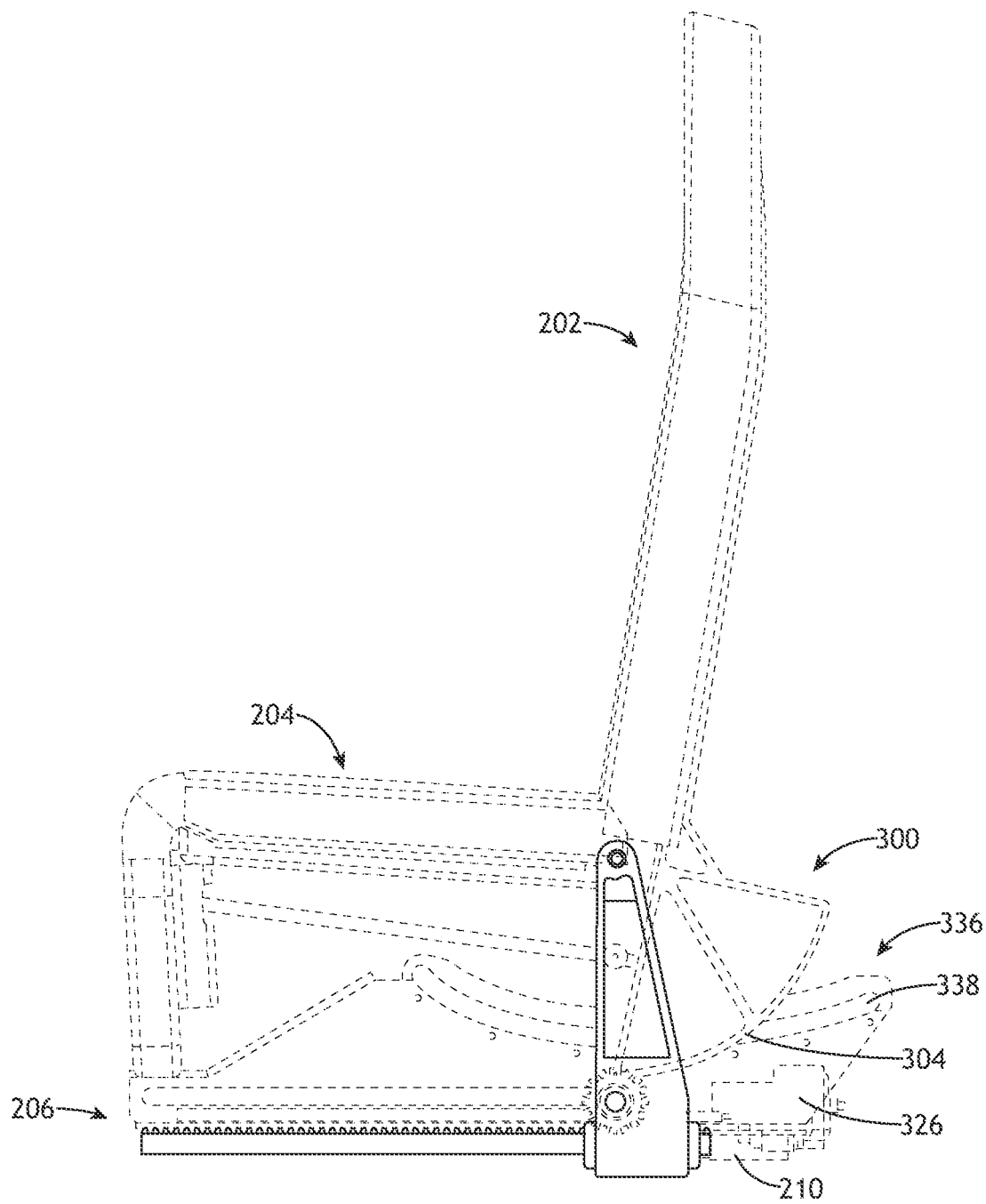
FIG. 4C illustrates the seat drivetrain assembly, in accordance with one or more embodiments of the disclosure.
Figure 5A:
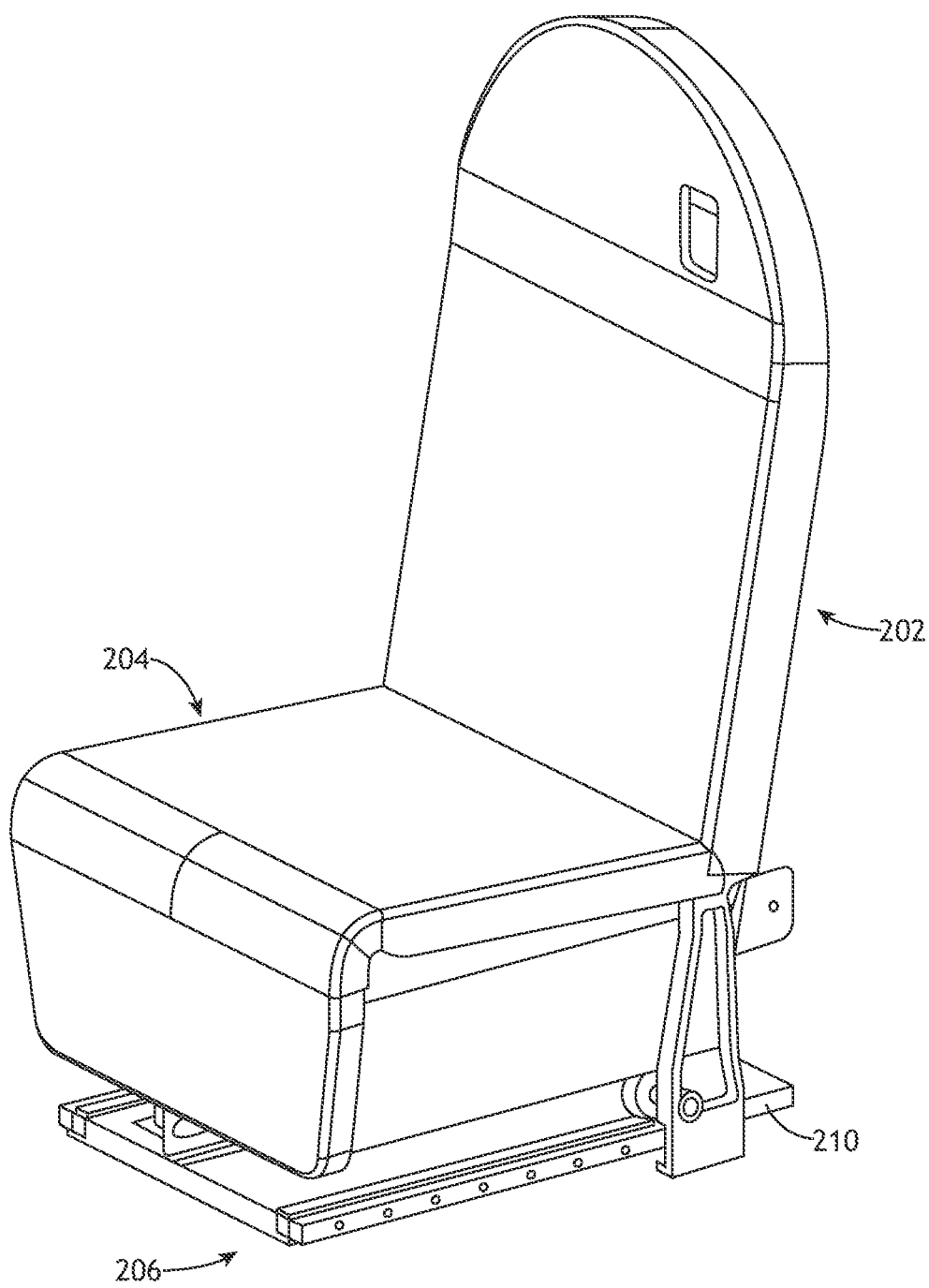
FIG. 5A illustrates a seat frame and a base assembly of the aircraft seat including a seat drivetrain assembly in an upright position, in accordance with one or more embodiments of the disclosure.
Figure 5B:
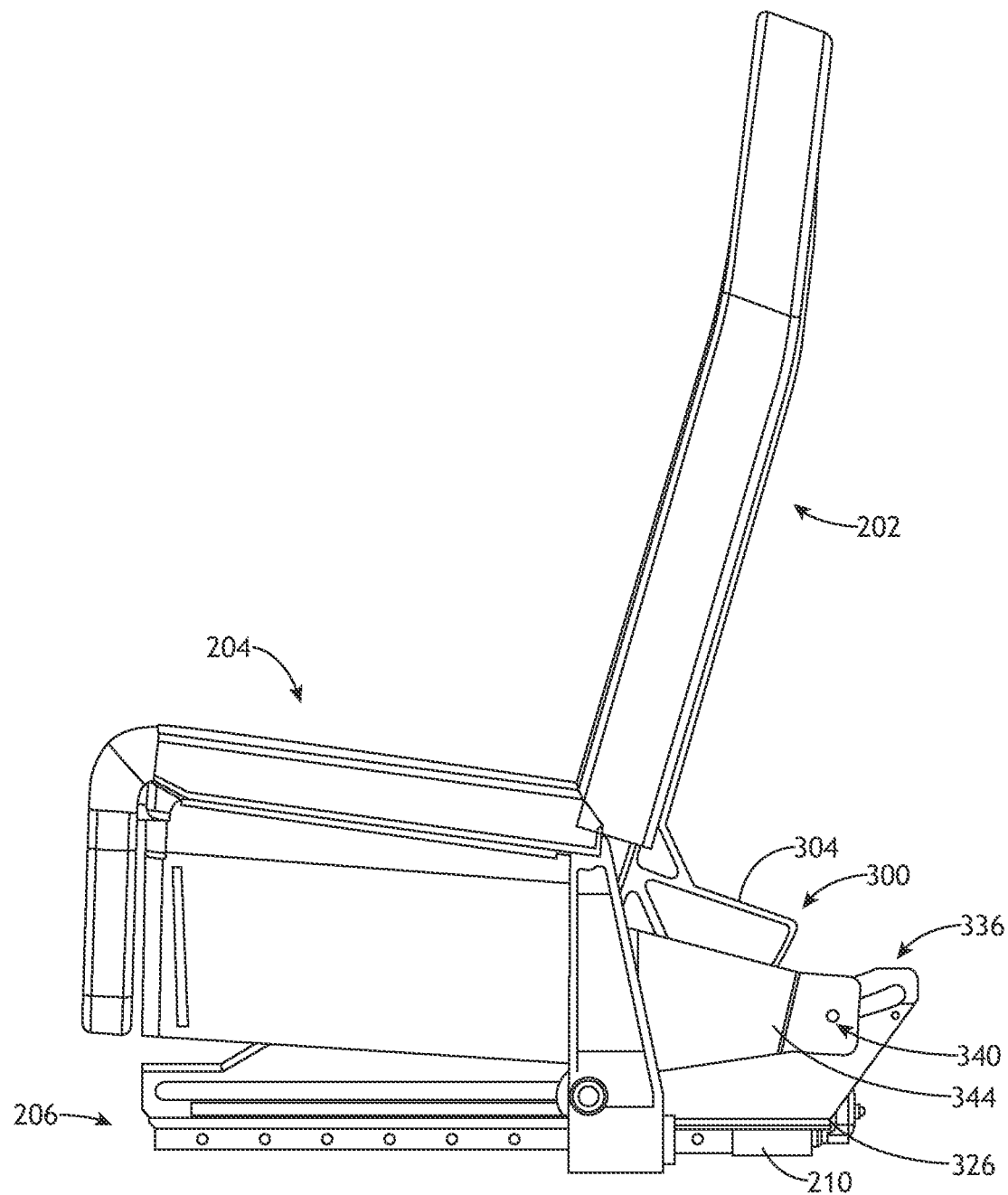
FIG. 5B illustrates a seat frame and a base assembly of the aircraft seat including a seat drivetrain assembly in an upright position, in accordance with one or more embodiments of the disclosure.
Figure 5C:
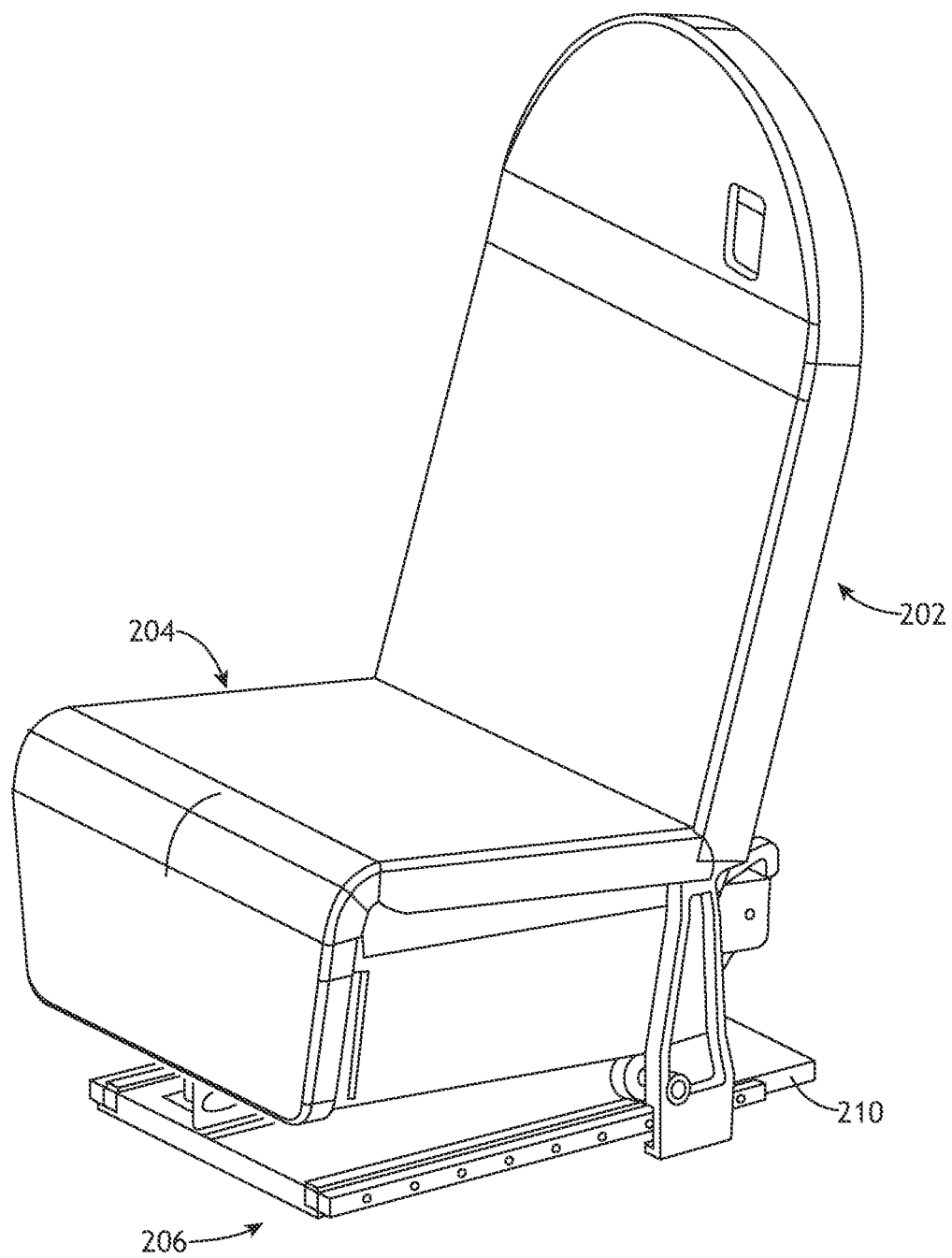
FIG. 5C illustrates a seat frame and a base assembly of the aircraft seat including a seat drivetrain assembly in an upright position, in accordance with one or more embodiments of the disclosure.
Figure 6A:
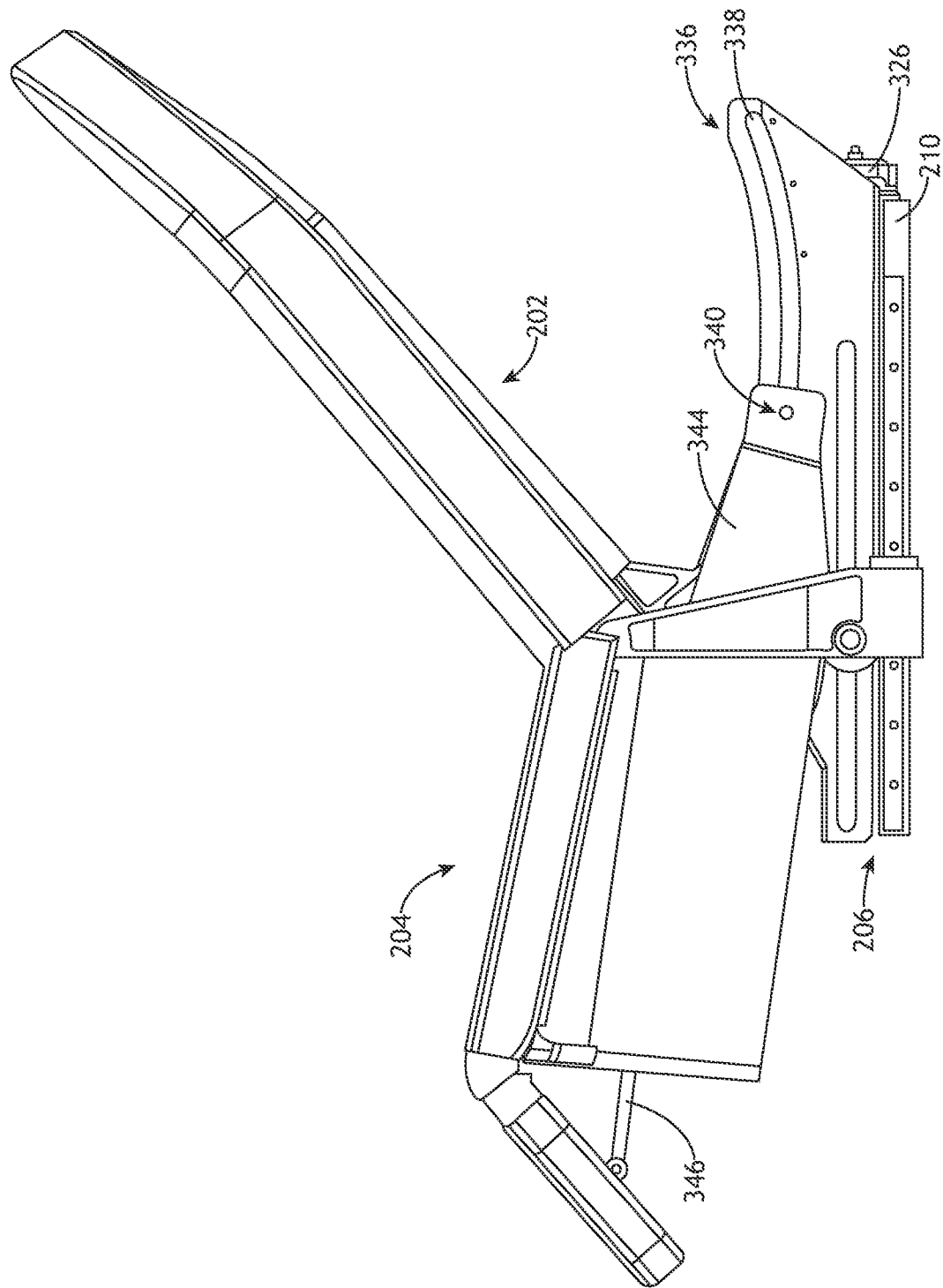
FIG. 6A illustrates a seat frame and a base assembly of the aircraft seat including a seat drivetrain assembly in an intermediate position, in accordance with one or more embodiments of the disclosure.
Figure 6B:
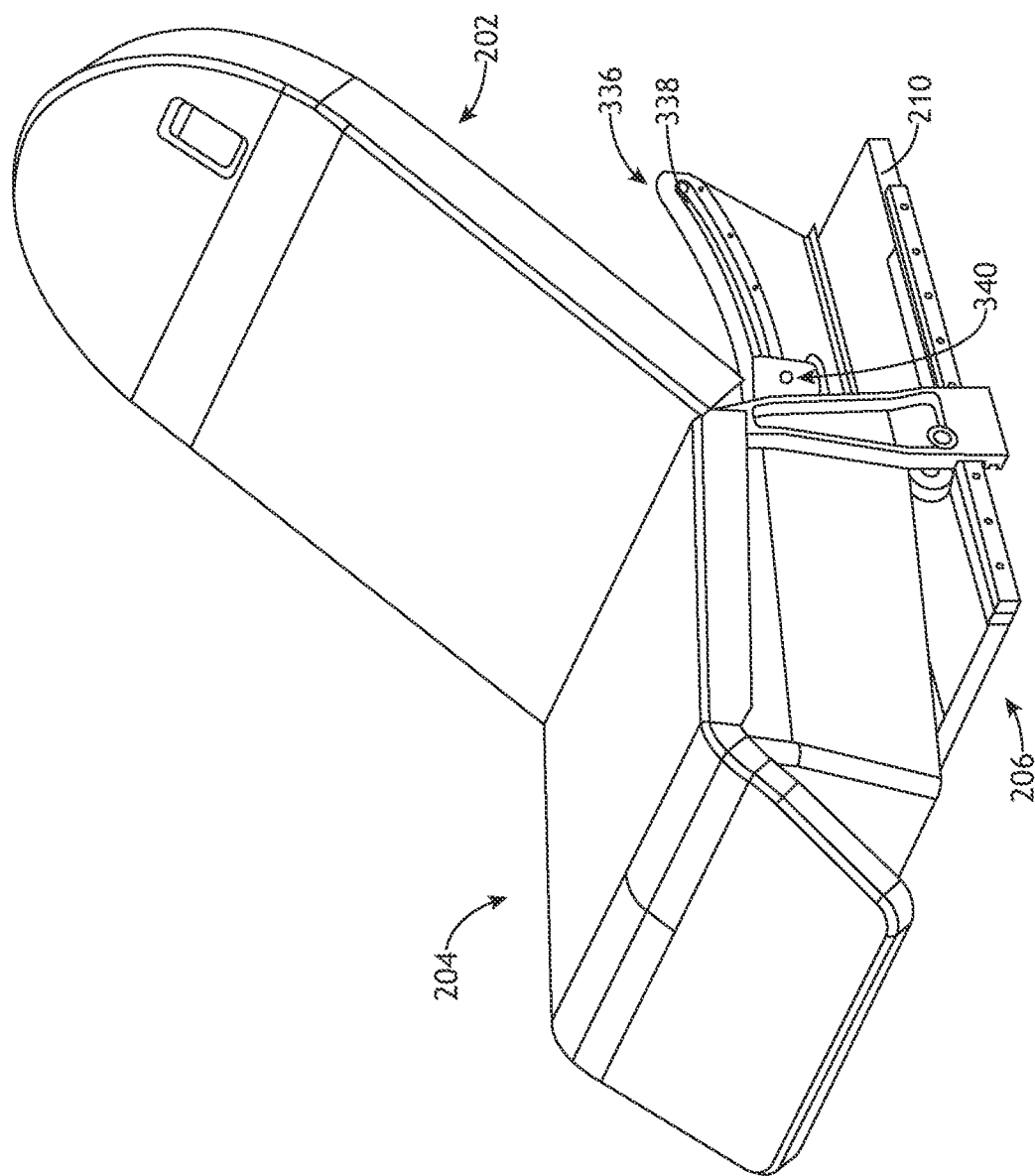
FIG. 6B illustrates a seat frame and a base assembly of the aircraft seat including a seat drivetrain assembly in an intermediate position, in accordance with one or more embodiments of the disclosure.
Figure 7A:
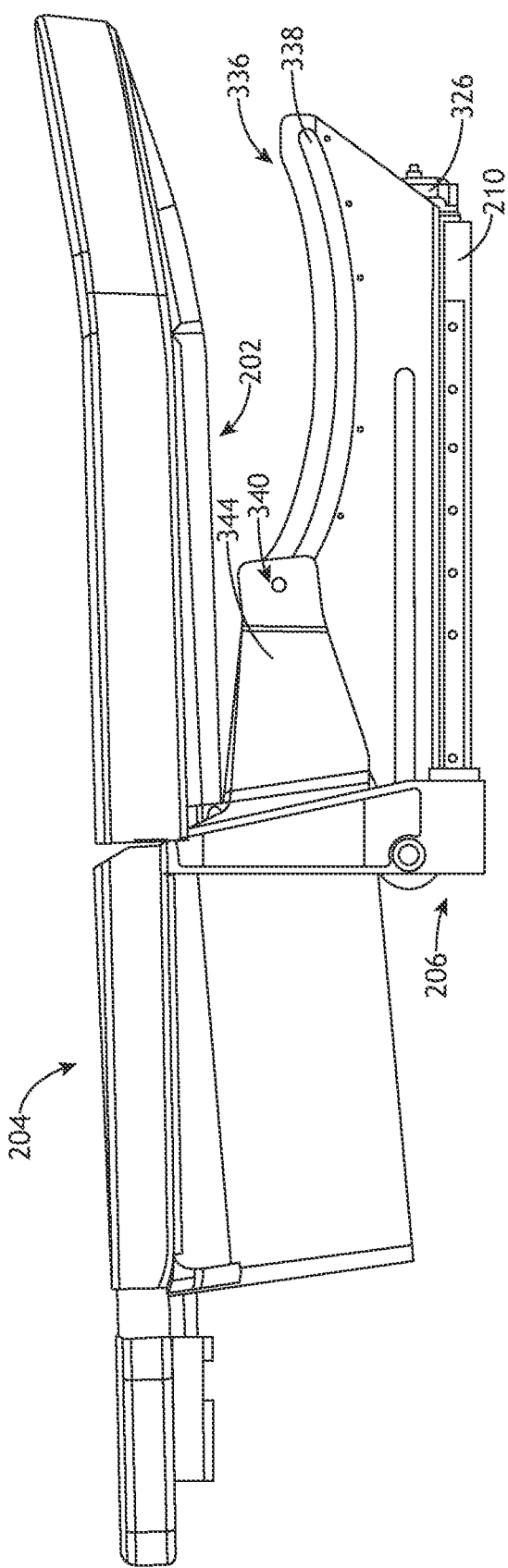
FIG. 7A illustrates a seat frame and a base assembly of the aircraft seat including a seat drivetrain assembly in a lie-flat position, in accordance with one or more embodiments of the disclosure.
Figure 7B:
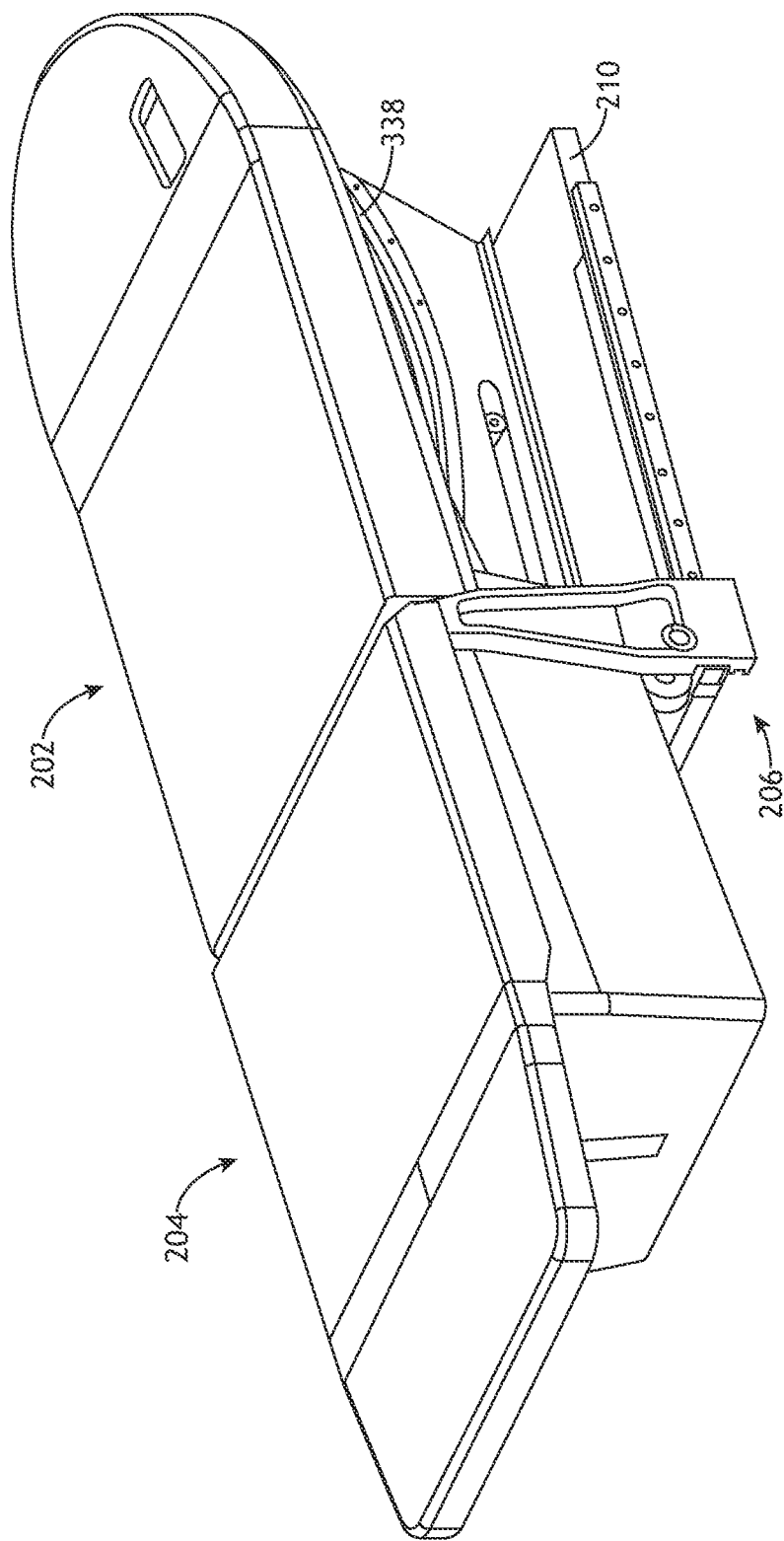
FIG. 7B illustrates a seat frame and a base assembly of the aircraft seat including a seat drivetrain assembly in a lie-flat position, in accordance with one or more embodiments of the disclosure.

Referring to FIG. 3A, the seatback drivetrain sub-assembly 214 may be coupled to one or more portions of the seatback frame 202 to cause the seatback frame 202 to be actuatable between one or more positions using the seatback drivetrain sub-assembly 214. For example, the one or more positions may include, but are not limited to, an upright or raised position, one or more lounge or reclined positions, and/or a lie-flat or bed position.

The seatback drivetrain sub-assembly 214 may include a sector gear 300 coupled to a portion of the seatback frame 202 and configured to at least partially actuate the seatback frame 202 between one or more positions (e.g., an upright or raised position, one or more lounge or reclined positions, and/or a lie-flat or bed position).

It is noted that the sector gear 300 may be any size or shape suitable for actuating the seatback frame 202 between the one or more positions. For example, as shown in FIG. 3A, the sector gear 300 may have a quadrant shape (quarter circle shape) with a surface of the sector gear 300 having an arc-shaped surface. In this instance, the arc-shaped surface may have a plurality of maximums and a minimum along the arc-shaped surface which define the one or more positions.

The seatback drivetrain sub-assembly 214 may include one or more spur gears 302 configured to engage with a portion of the sector gear 300. For example, the sector gear 300 may have teeth 304 cut along at least a portion of the sector gear's circumference (e.g., along the arc-shaped surface) and the remaining portion of the circumference may be smooth (without teeth). Further, the spur gear 302 may have teeth 306 that protrude radially from the center of the spur gear 302. In this regard, the teeth 304 of the sector gear 300 may be configured to engage with the teeth 306 of the spur gear 302 to cause the seatback frame 202 to actuate between one or more positions (e.g., an upright or raised position, one or more lounge or reclined positions, and/or a lie-flat or bed position).

The spur gear 302 may couple to a portion of the seat frame 200 via an axle 308. For example, the axle 308 may couple the spur gear 302 to a pan mount 309 on the seat frame 200. For instance, the actuator sub-assembly 220 may be configured to cause the spur gear 302 to rotate about an axis around the axle 308, which causes the teeth 304 of the spur gear 302 to engage with the teeth 304 of the sector gear 300. In this regard, the teeth 306 of the spur gear 302 may cause the sector gear 300 to rotate along with teeth 304 of the sector gear 300, which causes the seatback frame 202 to actuate between one or more positions (e.g., an upright or raised position, one or more lounge or reclined positions, and/or a lie-flat or bed position). When in the fully upright or raised position, the teeth 306 of the spur gear 302 may be engaged with a maximum 310 of the sector gear 300. When in the fully lie-flat or bed position, the teeth 306 of the spur gear 302 may be engaged with a maximum 312 of the sector gear 300. When in the lounge or reclined positions, the teeth 306 of the spur gear 302 may be engaged with a portion of the sector gear 300, where the portion may be between the maximums 310,312 of the arc-shaped surface of the sector gear 300. For instance, the teeth 306 of the spur gear 302 may be engaged with a minimum 314 of the sector gear 300.

While the seatback frame 202 is actuated between the one or more positions, the spur gear 302 may be configured to engage with one or more intermediate points ((e.g., between the maximum points 310,312) on the sector gear 300, such that the seatback frame 202 may be in one or more intermediate positions when actuating between the one or more positions.

The seatback drivetrain assembly 214 may include one or more rack-and-pinion sub-assemblies 316, where each rack-and-pinion sub-assembly 316 includes a pinion gear 318 and a gear rack 320 coupled to a surface of the one or more base rails 210 (or fabricated with the surface of the base rail), where the pinion gear 318 and the gear rack 320 are configured to engage. For example, the pinon gear 318 may include teeth 322 that correspond to the teeth 324 of the gear rack 320.

It is noted that the seatback drivetrain assembly 214 may include any type of gears 300, 302, 318. For example, the assembly 214 may include one or more helical gears.

The actuator sub-assembly 220 may include actuator 326 and a ball screw-and-nut assembly 328, where the ball screw-and-nut assembly 328 includes a ball screw 330 and a ball nut 332. For example, the ball screw 330 and the ball nut 332 may each include matching helical grooves for balls to roll between to provide contact between the ball screw 330 and the ball nut 332. The ball screw-and-nut assembly 328 may be configured to couple to the axle 308. For example, the ball nut 332 may include a housing 334 coupled to the ball nut 332 to couple the ball screw-and-nut assembly 328 to the axle 308. It is noted that the actuator sub-assembly 220 may include any type of screw-and-nut assembly including any type of screw and nut. For example, the actuator sub-assembly 220 may include a worm screw.

It is noted that the axle 308 may be mounted (fixed or floating) using any method known in the art to prevent the axle 308 from being displaced during rotation/translation.

It is noted that the actuator sub-assembly 220 may include any type of actuator known in the art. For example, the actuator sub-assembly 220 may include an electric actuator.

The actuator sub-assembly 220 may be configured to cause the pinion gear 318 to translate along the teeth 324 of the gear rack 320. For example, the actuator 228 may be coupled to a portion of the ball screw 230, such that the actuator 326 may be configured to cause the ball nut 332 to be axially displaced along the shaft of the ball screw 330. In this regard, when the ball nut 332 is axially displaced along the shaft of the ball screw 330, the housing 334 of the ball nut 332 may cause the pinion gear 318 to rotate along the longitude of the gear rack 320.

The seat pan drivetrain sub-assembly 216 may include a spreader 336 coupled to a portion of the base rails 210. The spreader 336 may include a groove 338. For example, the spreader 336 may include an arc-shaped groove 338.

The seat pan drivetrain sub-assembly 216 may include a cam follower 340 coupled to a portion of the seat pan frame 204. For example, the cam follower 340 may include a cam 342 and a follower 344.

The cam 342 may be configured to engage with the arc-shaped groove 338 of the spreader 336 to cause the seat pan drivetrain sub-assembly 216 to actuate between one or more positions (e.g., an upright or raised position, one or more lounge or reclined positions, and/or a lie-flat or bed position). For example, the cam 342 may be configured to translate along the arc-shaped groove 338. It is noted that translation along the arc-shaped groove 338 may be similar to a rocking motion.

The actuator 326, the spreader 336, the pan mount 309, and the hinge assembly 348 may be configured to work together to translate the seat pan frame 204. For example, the pivot between the seat pan frame 204 and the spreader 336/pan mount 300 allows the seat pan frame 204 to be guided by the cam follower path in the groove 338 to achieve the "rocking motion".

The leg rest drivetrain sub-assembly 218 may include a link 346 coupled to a portion of the leg rest frame 208 and a portion of the sector gear 300 of the seatback drivetrain sub-assembly 214. For example, the link 346 may be configured to cause the leg rest frame 208 to actuate between one or more positions (e.g., an upright or raised position, one or more lounge or reclined positions, and/or a lie-flat or bed position).

The seat drivetrain assembly 212 may include a linear guide sub-assembly 350 including a guide 352 and a linear slide 354. The linear guide 352 may be configured to couple to a surface of the base rail 210, such that the upper portion of the base rail 210 may include the gear rack and a side surface of the base rail 210 may include the linear guide 352. For example, the linear slide 354 may be configured to couple to the pan mount 309 of the seat frame 200 and be configured to slide along the linear guide 352 when translating between the one or more positions.

The actuator sub-assembly 220 may be configured to cause the aircraft seat 102 to actuate between one or more positions (e.g., an upright or raised position, one or more lounge or reclined positions, and/or a lie-flat or bed position). For example, the actuator sub-assembly 220 may be configured to cause one of the seatback drivetrain sub-assembly 214, the seat pan drivetrain sub-assembly 216, or the leg rest drivetrain sub-assembly 218 to actuate the aircraft seat 102 between the one or more positions (e.g., an upright or raised position, one or more lounge or reclined positions, and/or a lie-flat or bed position).

For example, the actuator 326 may be configured to rotate the axle 308, which causes the pan mount 309 to translate forward along with the spreader 336. This forward motion induces rotation of the spur gear 302 that is connected to the spreader 336 and the rack-and-pinion sub-assembly 316. Further, the spur gear 302 may be configured to rotate due to the forward motion of the pan mount 309/spreader 336. It is noted that the ratio of the spur gear 302 vs the larger pinion gear 318 defines the sector gear 300 rotation. The sector gear 300 may be directly attached to the seatback frame 202 thus controlling the seatback rotation during the aircraft seat 102 translation.

The aircraft seat 102 may be adjusted electrically. For example, the aircraft seat 102 may include a control panel for adjusting the aircraft seat 102. The control panel may be coupled to an aircraft controller. For example, a conduit coupled to the actuator 326 may directly run into a control panel coupled to the arms 108 of the aircraft seat 102. In this regard, a passenger may electrically adjust the position of the aircraft seat 102 via the control panel of the arms 108.

Although FIG. 1 depicts an aircraft cabin 100 without a passenger compartment, it is noted that the aircraft seat 102 may be positioned within a passenger compartment, where the passenger compartment is positioned within the aircraft cabin 100. Therefore, the above description should not be construed as limiting the scope of the present disclosure.

The passenger compartment may include a privacy shell with one or more privacy shell elements. The privacy shell may include an opening within the one or more privacy shell elements into the passenger compartment. The privacy shell may include a door, a curtain, or other privacy elements for the opening. For example, the door may swing or translate into an open position against a privacy shell element. By way of another example, a privacy shell element may be at least partially hollow, and the door may be slid into a cavity defined in the one or more privacy shell elements.

The passenger compartment may include one or more monuments. The aircraft seat 102 may be configured to avoid contact with the one or more monuments when actuating between positions (e.g., between the upright or raised position and the lie-flat or bed position).

At least a portion of the passenger compartment (e.g., at least a portion of the privacy shell, a monument of the one or more monuments, or the like) may conform to a portion of the aircraft seat 102. In this regard, the amount of aircraft cabin floor space necessary for the passenger compartment may be reduced.

The aircraft compartment may include a cavity or space. The aircraft seat 102 may be configured to fit within the cavity or space when actuating between positions (e.g., between the upright or raised position and the lie-flat or bed position). The privacy shell (and thus the passenger compartment) may not need to be configured to include additional geometrical constraints to accommodate the aircraft seat 102 in the lie-flat or bed position.

The aircraft seat 102 may be proximate to an ottoman. For example, the aircraft seat 102 and the ottoman may form the lie-flat surface when the aircraft seat 102 and the ottoman are each in a lie-flat position.

The ottoman may be positioned underneath and/or proximate to at least some of the one or more monuments of the passenger compartment. For example, the monument may include, but is not limited to, a side stand, a tray or table, or the like. Where the monument includes a tray or table, the tray or table may include a top surface, a bottom surface, and/or one or more side surfaces. For example, the tray may include a single continuous side surface where all corners are rounded. By way of another example, the tray may include up to an N number of side surfaces where the tray includes up to an N number of corners. The tray or table may be fixed in position. It is noted, however, that the tray or table may be actuatable (e.g., may extend a select distance from a stowed position to an extended position proximate to a passenger).

The ottoman may be positioned within a footwell of the passenger compartment. For instance, one or more dimensions of the footwell may be changed by actuating the aircraft seat 102 between the upright or raised position, a lounge or reclined position, and/or the lie-flat position. It is noted that a portion of the ottoman may be actuatable (e.g., along a set of tracks or linear rails) to a position outside of the footwell.

The ottoman may be configured to translate and/or rotate about an axis through a sidewall of the ottoman to point a top surface to a passenger occupying the aircraft seat 102. For example, where the ottoman may be configured to both translate and rotate, the ottoman may be configured to independently rotate and/or translate. By way of another example, where the ottoman may be configured to both translate and rotate, a rotation may prevent further translation until the ottoman is returned to a select position and/or a translation may prevent further rotation until the ottoman is returned to a select position.

Where the upper aircraft seat assembly includes the seat pan 106 and the seatback 104, the seat pan 106, the seatback 104, and the ottoman may form a set of upright or raised surfaces when the upper aircraft seat assembly 126 is in the upright or raised position. Where the upper aircraft seat assembly includes the seat pan 106 and the seatback 104, the seat pan 106, the seatback 104, and the ottoman may form a set of lounge or reclined surfaces when the upper aircraft seat assembly 126 is in the lounge or reclined position. Where the upper aircraft seat assembly 126 includes the seat pan 106 and the seatback 104, the seat pan 106, the seatback 104, and the ottoman may form a lie-flat or bed surface when the upper aircraft seat assembly 126 is in the lie-flat or bed position.

It is noted, however, the aircraft seat 102 and/or the ottoman may be limited to an upright or raised position and/or one or more lounge or reclined positions. In addition, it is noted the aircraft seat 102 may be the sole component forming a bed when the aircraft seat 102 is in a lie-flat position. Therefore, the above description should not be interpreted as a limitation on the present disclosure but merely an illustration.

In this regard, the seat drivetrain assembly 212 of the aircraft seat 102 may be configured to actuate the aircraft seat 102 between one or more positions. The seat drivetrain assembly 212 may result in a reduced weight, cost, and/or complexity of the aircraft seat 102.

It is noted the aircraft seat 102 and/or the components of the aircraft seat 102 (e.g., the seat drivetrain assembly 212 and other components) may be installed within an avionics environment and configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), the Society of Automotive Engineers (SAE), or any other standards setting organization or company; the Radio Technical Commission for Aeronautics (RTCA) or any other guidelines agency or organization; or the like.

Although embodiments of the disclosure are directed to an avionics environment, it is noted the seat drivetrain assembly 212 is not limited to the aircraft seat 102 within the avionics environment and/or the aircraft components within the avionics environment. For example, the seat drivetrain assembly 212 may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. For instance, the vehicle may include an automobile. By way of another example, the seat drivetrain assembly 212 may be coupled to and/or configured to operate with apparatus sold for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A seat drivetrain assembly for an aircraft seat comprising:
    a seatback drivetrain sub-assembly configured to actuate a seatback frame of a seat frame of the aircraft seat between a first position and at least a second position, the seatback drivetrain sub-assembly comprising:
        a first gear coupled to a portion of the seatback frame, the first gear including teeth along at least a portion of an exterior surface of the first gear;
        a second gear including teeth protruding radially from a center of the second gear, the second gear coupled to a portion of the seat frame of the aircraft seat via an axle, the axle configured to rotate to cause the second gear to rotate about an axis to cause the teeth of the second gear to engage with the teeth of the first gear to cause the first gear to actuate the seatback frame between the first position and the at least second position; and
        one or more rack-and-pinion assemblies, each rack-and-pinion assembly including a pinion gear and a gear rack, the gear rack configured to couple to a surface of a base assembly of the aircraft seat, the pinion gear configured to engage with the gear rack to cause the seatback frame to translate between a first position and at least a second position;
    a seat pan drivetrain sub-assembly configured to actuate a seat pan frame of the seat frame of the aircraft seat between the first position and at least the second position, the seat pan drivetrain sub-assembly comprising:
        a spreader including a groove, the groove having an arc-shape; and
        a cam-and-follower sub-assembly including a cam and a follower, the cam-and-follower sub-assembly configured to engage with the groove of the spreader and translate along an arc-shaped groove when the seat pan frame actuates between the first position and the at least second position; and
    an actuator sub-assembly configured to cause one of the seatback drivetrain sub-assembly or the seat pan drivetrain sub-assembly to actuate one of the seatback frame or the seat pan frame of the aircraft seat between the first position and the at least second position, the actuator sub-assembly comprising an actuator coupled to the seat frame.

2. The seat drivetrain assembly of claim 1, wherein the first gear includes a sector gear.

3. The seat drivetrain assembly of claim 2, wherein the exterior surface of the first gear is arc-shaped.

4. The seat drivetrain assembly of claim 1, wherein the second gear includes a spur gear.

5. The seat drivetrain assembly of claim 1, wherein the actuator sub-assembly further comprises:
a ball-and-screw nut assembly including a ball screw and a ball nut.

6. The seat drivetrain assembly of claim 1, further comprising:
a leg rest drivetrain sub-assembly configured to actuate a leg rest frame of the aircraft seat between a first position and at least a second position.

7. The seat drivetrain assembly of claim 6, wherein the leg rest frame section is coupled to a portion of the seat pan frame via a two-part hinge assembly, the two-part hinge assembly including a first component coupled to the portion of the seat pan frame and a second component coupled to the leg rest frame.

8. The seat drivetrain assembly of claim 6, wherein the leg rest drivetrain sub-assembly comprises:
a link coupled to a portion of the leg rest frame section and a portion of the first gear.

9. The aircraft seat of claim 1, wherein the first position includes a taxi, take-off, or landing (TTL) position, the at least the second position including at least one non-TTL position.

10. An aircraft seat comprising:
a base assembly couplable to a floor of an aircraft cabin;
a seat drivetrain assembly configured to actuate the aircraft seat between a first position and at least a second position; and
a seat frame coupled to the base assembly via the seat drivetrain assembly, the seat frame including a seatback frame and a seat pan frame, the seat frame further including a leg rest frame coupled to a portion of the seat pan frame,
the seat drivetrain assembly comprising:
a seatback drivetrain sub-assembly configured to actuate the seatback frame between a first position and at least a second position, the seatback drivetrain sub-assembly comprising:
a first gear coupled to a portion of the seatback frame, the first gear including teeth along at least a portion of an exterior surface of the first gear;
a second gear including teeth protruding radially from a center of the second gear, the second gear coupled to a portion of the seat frame via an axle, the axle configured to rotate to cause the second gear to rotate about an axis to cause the teeth of the second gear to engage with the teeth of the first gear to cause the first gear to actuate the seatback frame between the first position and the at least second position; and
one or more rack-and-pinion assemblies, each rack-and-pinion assembly including a pinion gear and a gear rack, the gear rack configured to couple to a surface of the base assembly of the aircraft seat, the pinion gear configured to engage with the gear rack to cause the seatback frame to translate between a first position and at least a second position;
a seat pan drivetrain sub-assembly configured to actuate the seat pan frame of the seat frame of the aircraft seat between a first position and at least a second position, the seat pan drivetrain sub-assembly comprising:
a spreader including a groove, the groove having an arc-shape; and
a cam-and-follower sub-assembly including a cam and a follower, the cam-and-follower sub-assembly configured to engage with the groove of the spreader and translate along the arc-shaped groove when the seat pan frame actuates between the first position and the at least second position; and
an actuator sub-assembly configured to cause one of the seatback drivetrain sub-assembly or the seat pan drivetrain sub-assembly to actuate one of the seatback frame or the seat pan frame between the first position and the at least second position, the actuator sub-assembly comprising an actuator coupled to the seat frame.

11. The aircraft seat of claim 10, wherein the first gear includes a sector gear and the second gear includes a spur gear.

12. The aircraft seat of claim 10, wherein the actuator sub-assembly further comprises:
a ball-and-screw nut assembly including a ball screw and a ball nut.

13. The aircraft seat of claim 10, further comprising:
a leg rest drivetrain sub-assembly configured to actuate the leg rest frame between a first position and at least a second position.

14. The aircraft seat of claim 13, wherein the leg rest drivetrain sub-assembly comprises:
a link coupled to a portion of the leg rest frame and a portion of the first gear.

15. The aircraft seat of claim 10, wherein the first position includes a taxi, take-off, or landing (TTL) position, the at least the second position including at least one non-TTL position.

* * * * *